No. 630,472. Patented Aug. 8, 1899.
A. SWAHN.
TIRE FASTENER.
(Application filed May 31, 1898.)
(No Model.)
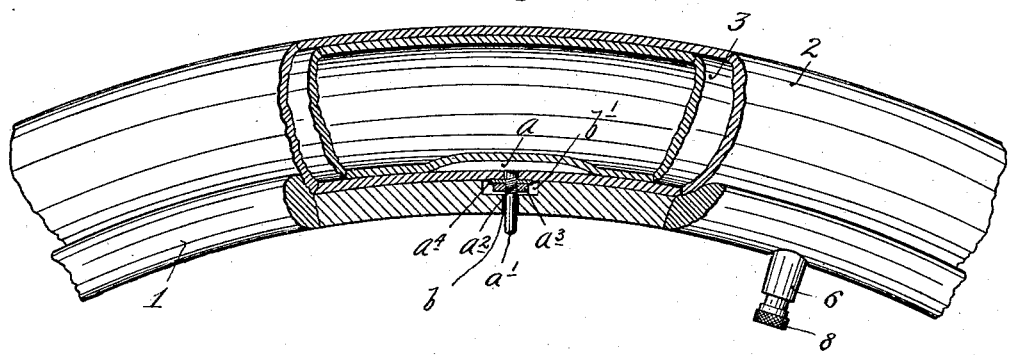
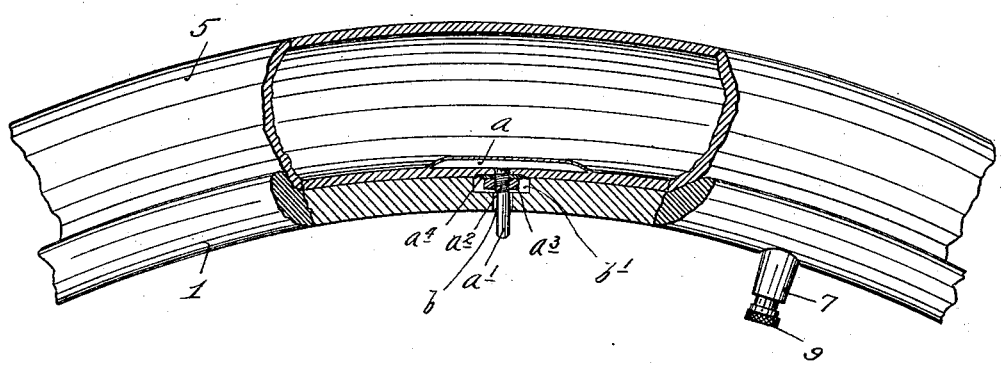
Witnesses.
Harry Kilgore,
F. D. Merchant.
Inventor.
Adolph Swahn,
By his Attorney,
Jas. F. Williamson.
THE NORRIS PETERS CO., PHOTO-LITHO., WASHINGTON, D. C.

UNITED STATES PATENT OFFICE.

ADOLPH SWAHN, OF ELLSWORTH, WISCONSIN.

TIRE-FASTENER.

SPECIFICATION forming part of Letters Patent No. 630,472, dated August 8, 1899.

Application filed May 31, 1898. Serial No. 682,101. (No model.)

*To all whom it may concern:*

Be it known that I, ADOLPH SWAHN, a citizen of the United States, residing at Ellsworth, in the county of Pierce and State of Wisconsin, have invented certain new and useful Improvements in Tire-Fasteners; and I do hereby declare the following to be a full, clear, and exact description of the invention, such as will enable others skilled in the art to which it appertains to make and use the same.

My invention has for its object to provide an improved device for securing pneumatic tires, such as used on bicycles, to the wheel-rims without the use of cement; and to this end my invention consists of the novel devices and combinations of devices hereinafter described, and defined in the claim.

Several serious objections have been found to the use of cement for securing the pneumatic tires to the wheel-rims, and the most serious of these will be briefly noted. While cement will at times so rigidly secure the tire to the rim of the wheel that it can only be removed by the use of gasolene or similar liquid, it will at other times and very frequently permit the tire to become loose. When the cemented tire becomes loose, it will creep or shift circumferentially on the rim, and thereby cause the nipple or charging-tube to be cut and caused to leak, and it is also very liable even when well inflated to roll from the rim, and thus often cause serious accidents to the rider as well as to the machine. Again, the cement when applied to the tire will in the case of a double-tube tire gum up the lacing at the opening through which the inner tube is passed, so that it becomes necessary to cut and destroy this lacing in order to remove the inner tube to cure a puncture. Hence it is obvious that it is an exceedingly difficult performance to remove and replace a tire while on the road. As a substitute for cement, mechanical devices consisting of screw-threaded projections on the tire, engageable through perforations in the rim and held to the rim by nuts, have been used. This construction is subject to the objections that considerable time is consumed in removing the nuts before the tire can be removed, and, furthermore, I have found in practice that the screw-threads of such projecting stems will catch in their seats in the rim and make the removal of the tire extremely difficult. By my invention I overcome the above defects and at the same time provide means whereby the tire will be very securely held to the rim when inflated and may be very easily and quickly removed and replaced in working position when deflated.

My invention is illustrated in the accompanying drawings, wherein like characters indicate like parts throughout both the views.

Figure 1 is a view, partly in side elevation and partly in vertical section, showing a portion of a double-tube tire and a portion of a wheel-rim, the same being secured together by one of my improved fasteners; and Fig. 2 is a similar view to Fig. 1, illustrating the fastener applied to a single-tube tire.

1 indicates the rim of an ordinary bicycle-wheel.

2 indicates the outer tube, and 3 the inner tube, of a double-tube tire.

5 indicates a single-tube tire.

6 indicates the nipple or charging-tube of the double-tube tire, and 7 the nipple or charging-tube of the single-tube tire.

8 and 9 indicate, respectively, the removable caps of the nipples 6 and 7.

In accordance with my invention I provide fastening devices, each consisting of thin heads $a$, bent to conform to the shape of the tire and provided with projecting stems $a'$. These projecting stems $a'$ are perfectly smooth, except for a small section close to the head $a$, as shown at $a^2$. A nut $a^3$ works on the screw-threaded portion $a^2$ and keeps the threads covered, or nearly so. Between the nut $a^3$ and the head $a$ a washer $a^4$ is placed.

In applying these fasteners to a double-tube tire, as shown in Fig. 1, the stems $a'$ are passed outward through the inner wall of the outer tube 2, the washer $a^4$ is then placed on the stem $a'$ and against the tube 2, and the nut $a^3$ is then applied and screwed up to cause the washer $a^4$ and head $a$ to tightly clamp said tube 2.

In applying the said fastener to a single-tube tire the head $a$ is preferably embedded in the inner wall of the tire during the process of manufacture. The washer $a^4$ and nut $a^3$ are then applied, as previously described. In this construction a very thin layer may be passed over the inner surface of the head $a$, thus leaving the main part or thickness of the tire on the stem side of head $a$. This gives a much stronger web to be clamped between said head $a$ and said washer $a^4$ than would be afforded if the nut $a^3$ were to be dispensed with, for in this latter case lateral strains on the stem $a'$ would cause the head $a$ to break through a thin inner web. Furthermore, in either the single or double tube tire the nut and washer are of the utmost importance, as they clamp the tire over a considerably-extended surface and prevent the fastener from slipping around and increasing the size of the perforation through which the stems are passed. Any desired or necessary number of these fasteners may be used on a tire.

To adapt the wheel-rim to receive a tire provided with the fasteners above described, it is formed with perforations $b$, that are enlarged or countersunk at their outer extremities, as shown at $b'$, so as to receive the stems $a'$ and nuts $a^3$. When the tire is inflated, the stems $a'$ cannot possibly be withdrawn from their seats in the rim; but when the tire is deflated it may be very quickly and easily removed. In removing the tire when deflated it is rolled or pulled sidewise as well as outward, and this will cause the stem $a'$ to tightly engage its seat; but as it is smooth it may be readily withdrawn and will not catch or tear the walls of its seat or coöperating perforation $b$ in the rim. Another important advantage is secured by allowing the stems $a'$ to project through the rim without being positively secured thereto—to wit, if a rim be accidentally broken or collapsed that section which is bulged inward is free to pull loose from the tire and from the fastening devices. If the stems of the fasteners—that is, the portions of the same which project through the rim—were screw-threaded, so that they would catch in their seats in the rim, and more certainly if said stems were positively secured to the rim of the wheel by nuts or otherwise, the heads of the fastener would be torn from the tire or caused to puncture the same when a wheel-rim broke or collapsed.

The importance of the construction herein set forth is thought to be obvious from the foregoing statements.

It will of course be understood that various alterations in the specific details of construction above described may be made within the scope of my invention. For example, it is obvious that, if desired, the seats or perforations in the wheel-rim through which the stems of the fasteners are passed might be provided with metallic bushings.

What I claim, and desire to secure by Letters Patent of the United States, is as follows:

The combination with a wheel-rim having a plurality of countersunk perforations $b$, of a pneumatic tire having a plurality of fasteners adapted to project loosely through the perforations in the rim to secure the tire thereto, said fasteners consisting of thin disk-like heads $a$, having integral stems $a'$ projecting through the tire and the perforations in the rim, and provided on that portion within the countersinks with screw-threads $a^2$, washers $a^4$, and nuts $a^3$, the portions of said stems which project through the perforations in the rim being smooth.

In testimony whereof I affix my signature in presence of two witnesses.

ADOLPH SWAHN.

Witnesses:
  C. M. STIRRAL,
  C. L. MUGGALS.